US010528707B2

(12) United States Patent
Bouazizi et al.

(10) Patent No.: US 10,528,707 B2
(45) Date of Patent: Jan. 7, 2020

(54) ENABLING CONTENT PROTECTION OVER BROADCAST CHANNELS

(71) Applicant: Samsung Electronics Co., Ltd., Suwon-si, Gyeonggi-do (KR)

(72) Inventors: Imed Bouazizi, Frisco, TX (US); Youngkwon Lim, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 14/992,990

(22) Filed: Jan. 11, 2016

(65) Prior Publication Data

US 2016/0364551 A1 Dec. 15, 2016

Related U.S. Application Data

(60) Provisional application No. 62/175,852, filed on Jun. 15, 2015.

(51) Int. Cl.
*H04L 9/00* (2006.01)
*G06F 21/10* (2013.01)
(Continued)

(52) U.S. Cl.
CPC ....... *G06F 21/10* (2013.01); *H04N 21/23476* (2013.01); *H04N 21/2541* (2013.01);
(Continued)

(58) Field of Classification Search
CPC ........................................................ G06F 21/10
(Continued)

(56) References Cited

U.S. PATENT DOCUMENTS 4,797,918 A * 1/1989 Lee ........................ H04H 20/28 348/E7.037
5,343,527 A 8/1994 Moore
(Continued)

FOREIGN PATENT DOCUMENTS

JP 2003-174446 A 6/2003
JP 2003-333507 A 11/2003
(Continued)

OTHER PUBLICATIONS

International Search Report dated Sep. 8, 2016 in connection with international Application No. PCT/KR2016/006280, 3 pages.
(Continued)

*Primary Examiner* — Christopher J Brown

(57) ABSTRACT

A method, receiver, and server enable content protection over broadcast channels. A method for receiving a media license includes receiving broadcast media data including at least a portion that is protected and requesting a message from a content decryption module (CDM) of the receiver. The method includes receiving a license signaling message including encrypted license data and identifying one or more hash codes in the license signaling message. Additionally, the method includes identifying the encrypted license data for the receiver based on a mapping between the one or more hash codes and a hash of the message from the CDM. A server for providing a media license sends, to a receiver or a group of receivers, a license signaling message including encrypted license data and a license message hash indicating a hash code used to identify the receiver or the group of receivers for the encrypted license data.

18 Claims, 3 Drawing Sheets

100 102 104 106 108 110 112 114 115 116 118

(51) Int. Cl.

| | |
|---|---|
| ***H04N 21/4623*** | (2011.01) |
| ***H04N 21/4627*** | (2011.01) |
| ***H04N 21/6334*** | (2011.01) |
| ***H04N 21/647*** | (2011.01) |
| ***H04N 21/435*** | (2011.01) |
| ***H04N 21/258*** | (2011.01) |
| ***H04N 21/254*** | (2011.01) |
| ***H04N 21/2347*** | (2011.01) |
| ***H04N 21/266*** | (2011.01) |
| ***H04N 21/4405*** | (2011.01) |

(52) U.S. Cl.

CPC . *H04N 21/25816* (2013.01); *H04N 21/26613* (2013.01); *H04N 21/4353* (2013.01); *H04N 21/44055* (2013.01); *H04N 21/4623* (2013.01); *H04N 21/4627* (2013.01); *H04N 21/6334* (2013.01); *H04N 21/63345* (2013.01); *H04N 21/64715* (2013.01); *G06F 2221/0768* (2013.01); *G06F 2221/2107* (2013.01); *G06F 2221/2149* (2013.01)

(58) Field of Classification Search

USPC .......................................................... 713/162

See application file for complete search history.

(56) References Cited

U.S. PATENT DOCUMENTS

| | | | | |
|---|---|---|---|---|
| 7,085,850 | B2 * | 8/2006 | Calvignac | H04L 29/06 370/389 |
| 7,496,956 | B1 * | 2/2009 | Viljoen | G06F 21/54 709/244 |
| 7,720,223 | B2 * | 5/2010 | Ezaki | G11B 19/122 380/201 |
| 7,779,482 | B1 | 8/2010 | Yen et al. | |
| 8,891,765 | B1 | 11/2014 | Dorwin | |
| 2002/0065732 | A1 | 5/2002 | Rodgers et al. | |
| 2005/0022025 | A1 | 1/2005 | Hug | |
| 2005/0066355 | A1 | 3/2005 | Cromer et al. | |
| 2006/0149683 | A1 | 7/2006 | Shimojima et al. | |
| 2006/0171530 | A1 | 8/2006 | Futa et al. | |
| 2006/0274898 | A1 | 12/2006 | Pedlow | |
| 2007/0240234 | A1 | 10/2007 | Watson | |
| 2007/0300310 | A1 * | 12/2007 | Molaro | G06F 21/10 726/29 |
| 2008/0005029 | A1 | 1/2008 | Ando | |
| 2008/0010207 | A1 | 1/2008 | Yanagihara et al. | |
| 2008/0027870 | A1 * | 1/2008 | Nam | G06F 21/10 705/59 |
| 2008/0028471 | A1 | 1/2008 | Chen et al. | |
| 2009/0313704 | A1 * | 12/2009 | Chou | G06F 21/10 726/29 |
| 2010/0217992 | A1 | 8/2010 | Hamlin et al. | |
| 2010/0296655 | A1 | 11/2010 | Solow et al. | |
| 2013/0276067 | A1 * | 10/2013 | Goyal | G06F 21/6209 726/4 |

FOREIGN PATENT DOCUMENTS

| | | | |
|---|---|---|---|
| JP | 2005-6056 | A | 1/2005 |
| JP | 2007-527056 | A | 9/2007 |
| JP | 2008-16013 | A | 1/2008 |
| WO | 2004109972 | A1 | 12/2004 |
| WO | WO2014154535 | A1 | 10/2014 |

OTHER PUBLICATIONS

Written Opinion of the International Searching Authority dated Sep. 8, 2016 in connection with International Application No. PCT/KR2016/006280, 7 pages.

Supplementary European Search Report dated May 3, 2018 in connection with European Patent Application No. 16 81 1886.

Notice of Preliminary Rejection regarding Japanese Patent Application No. 2017-564830, dated Feb. 12, 2019, 15 pages.

European Patent Office Communication pursuant to Article 94(3) EPC dated Aug. 6, 2019 regarding Application No. 16811886.7, 8 pages.

Notice of Patent Grant regarding Japanese Application No. 2017-564830, dated Oct. 23, 2019, 5 pages.

Dorwin, et al.(Eds.), "Encrypted Media Extensions", W3C Editor's Draft, Aug. 25, 2014, 25 pages.

* cited by examiner

ENABLING CONTENT PROTECTION OVER BROADCAST CHANNELS

CROSS-REFERENCE TO RELATED APPLICATION(S) AND CLAIM OF PRIORITY

The present application claims priority to U.S. Provisional Patent Application Ser. No. 62/175,852, filed Jun. 15, 2015, entitled "Method and Apparatus for Enabling Content Protection over Pure Broadcast Channels". The content of the above-identified patent document is incorporated herein by reference.

TECHNICAL FIELD

This disclosure relates generally to broadcasted media content. More specifically, this disclosure relates to enabling content protection over broadcast channels.

BACKGROUND

Common encryption (CENC) specifies a generic encryption that can be utilized by one or more digital rights and key management systems (DRM systems) to enable decryption of the same file using different DRM system. CENC is a generic encryption scheme that includes stream encryption and storage of stream encryption parameters, for International Organization for Standardization (ISO) Base Media Files (ISOBMFF). An advantage of CENC is that providing a common way to encrypt content decouples the content encryption from the key acquisition. This provides support for multiple DRM systems.

The CENC mechanism only encrypts media samples or parts thereof and leaves the ISOBMFF metadata such as the file and track structure boxes un-encrypted to enable players to recognize and read the file correctly and acquire any required license. CENC supports the encryption of network abstraction layer (NAL) based video encoding formats such as Advanced Video Coding (AVC) and High Efficiency Video Coding (HEVC). Thus, CENC offers sub-sample encryption capability, where only the video data of a sub-sample is encryption, while the NAL header is not. This flexibility can be used to offer a free preview of a video, enable editing and processing of the video, or provide free access to some service components such as audio. By providing offsets to the encrypted byte ranges inside a sample in an "mdat", players can easily process the file and pass the encrypted chunks to the decryptor for decryption and playback.

SUMMARY

This disclosure provides for enabling content protection over broadcast channels.

In one embodiment, a receiver for receiving a media license is provided. The receiver includes a communication unit and a controller. The communication unit is configured to receive broadcast media data including at least a portion that is protected and receive a license signaling message including encrypted license data. The controller is configured to generate a request for a message from a content decryption module (CDM) of the receiver; identify one or more hash codes in the license signaling message; and identify the encrypted license data for the receiver based on a mapping between the one or more hash codes in the license signaling message and a hash of the message from the CDM.

In another embodiment, a method for receiving a media license by a receiver is provided. The method includes receiving broadcast media data including at least a portion that is protected and requesting a message from a CDM of the receiver. The method also includes receiving a license signaling message including encrypted license data and identifying one or more hash codes in the license signaling message. Additionally, the method includes identifying the encrypted license data for the receiver based on a mapping between the one or more hash codes in the license signaling message and a hash of the message from the CDM.

In yet another embodiment, a server for providing a media license is provided. The server includes a controller and a communication unit. The communication unit is configured to send, under control of the controller, a license signaling message including (i) encrypted license data and (ii) a license message hash indicating a hash code used to identify a receiver or a group of receivers for the encrypted license data, to the receiver or the group of receivers.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

In order for decryption to work, embodiments of the present disclosure recognize that CENC provides the following information in the ISOBMFF:

- Key Identifiers: a key ID is associated with every encrypted sample in a track in case a single key is used for the whole track;
- Initialization Vectors (IVs): the IV is used for randomization and removal of semantics and is used for strong protection. For every sample, the IV is known in order to be able to construct the decryption key; and
- License Acquisition Information: information about license acquisition is specific to each DRM system. A media player application needs to support at least one of the DRM systems that offer access to the encrypted stream.

Embodiments of the present disclosure recognize and take into account that CENC defines a way to store the previous information in the ISOBMFF. The key identifiers may be provided: as the default KID in the track encryption box "tenc", when a single key applies to the whole track; as a key for a set of samples that share the same encryption key, provided in a sample grouping structure using the sample group description box "sgpd". The IV for every sample is provided as part of the sample auxiliary information in the "mdat" or in the "senc" together with information about the position of the encrypted chunks. The license acquisition information is provided as part of the protection system specific header box "pssh", where each DRM system is identified by a SystemID. The "pssh" box also provides a list of the provided key identifiers and opaque system-specific information that describe how to acquire the keys identified by the supported key identifiers.

Based on the foregoing, embodiments of the present disclosure recognize and take into account that license information is needed to access content protected by certain DRM systems. This is particularly challenging for receivers that receive broadcasted media data that is protected over a pure broadcast channel without a return channel. Accordingly, embodiments of the present disclosure enable content protection in a communication system that includes pure broadcast channels.

Figure 1:
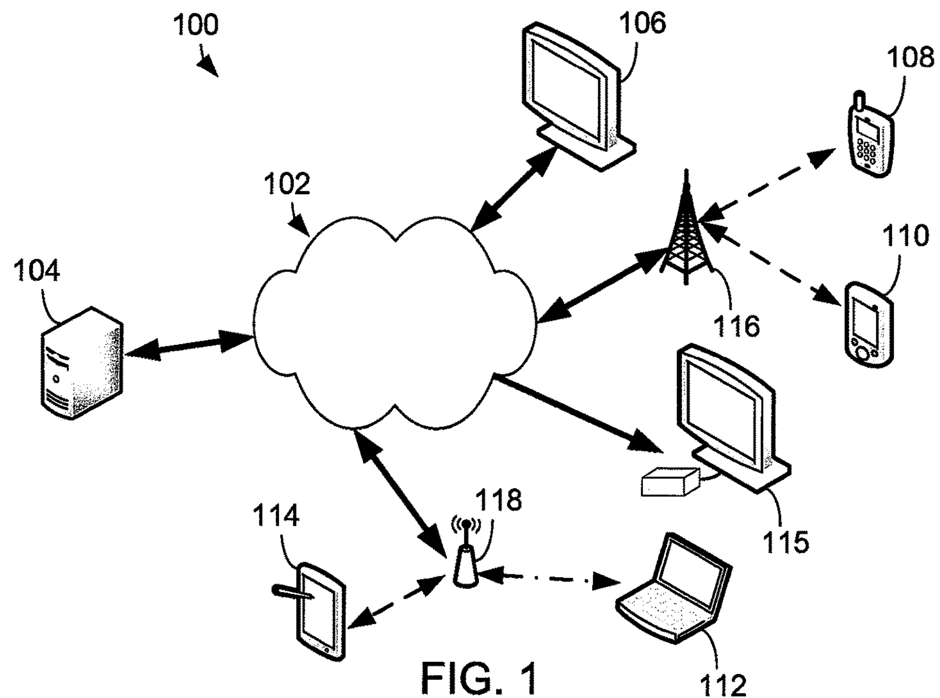
FIG. 1 illustrates an example communication system in which various embodiments of the present disclosure may be implemented.

FIG. 1 illustrates an example communication system 100 in which various embodiments of the present disclosure may be implemented. The embodiment of the communication system 100 shown in FIG. 1 is for illustration only. Other embodiments of the communication system 100 could be used without departing from the scope of this disclosure.

As shown in FIG. 1, the system 100 includes a network 102, which facilitates communication between various components in the system 100 on one or more communication channels. The network 102 may communicate Internet Protocol (IP) packets, frame relay frames, or other information between network addresses. The network 102 may include one or more local area networks (LANs): metropolitan area networks (MANs); wide area networks (WANs); all or a portion of a global network, such as the Internet; or any other communication system or systems at one or more locations.

In various embodiments, network 102 includes a broadcast and broadband networks and communication channels for communicating media data (e.g., video, picture, audio content) to client devices 106-115. The broadcasting elements of network 102, such as cable and satellite communication links, provides broadcast of media data to client devices 106-115 which is generally one way, e.g., from one or more of the servers 104 to the client devices 106-115. The network 102 may include any number of broadcast links, channels, and devices, such as, for example, satellite, wireless, wireline, and fiber optic network links and devices. Broadband network **102*b* provides broadband access to media data for client devices 106-115, which is generally two way, e.g., back and forth from one or more of the servers 104 to the client devices 106-115. Broadband network 102*b*** may include any number of broadband links, channels, and devices, such as, for example, Internet, wireless, wireline, and fiber optic network links and devices.

The network 102 facilitates communications between one or more servers 104 and various client devices 106-115. Each of the servers 104 includes any suitable computing or processing device that can provide computing services for one or more client devices. Each of the servers 104 could, for example, include one or more processing devices, one or more memories storing instructions and data, and one or more network interfaces facilitating communication over the network 102. For example, one or more of the servers 104 may include broadcast servers that broadcast media data over a broadcast network in network 102 using broadcast channels. In another example, one or more of the servers 104 may include servers that broadcast or unicast media data over a broadband network in network 102 using, for example, DASH MPEG Media Transport (MMT). In another example, one or more of the servers 104 may be a licensing server for a DRM system that provides license data for protected media data distributed in network 102, as discussed in greater detail below.

Each client device 106-115 represents any suitable computing or processing device that interacts with at least one server or other computing device(s) over the network 102. In this example, the client devices 106-115 include an internet connected computer or television 106, a mobile telephone or smartphone 108, a personal digital assistant (PDA) 110, a laptop computer 112, tablet computer 114; and a set-top box and/or television 115. However, any other or additional client devices could be used in the communication system 100. In this example, some client devices 108-114 communicate indirectly with the network 102. For example, the client devices 108-110 communicate via one or more base stations 116, such as cellular base stations or eNodeBs. Also, the client devices 112-115 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

As will be discussed in greater detail below, set-top box and/or television 115 receive media data over a pure broadcast channel (e.g., one way broadcast communication channel without a return channel). One or more of the servers 104 provides license data for protected media data distributed in network 102 to enable content protection over pure broadcast channels.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
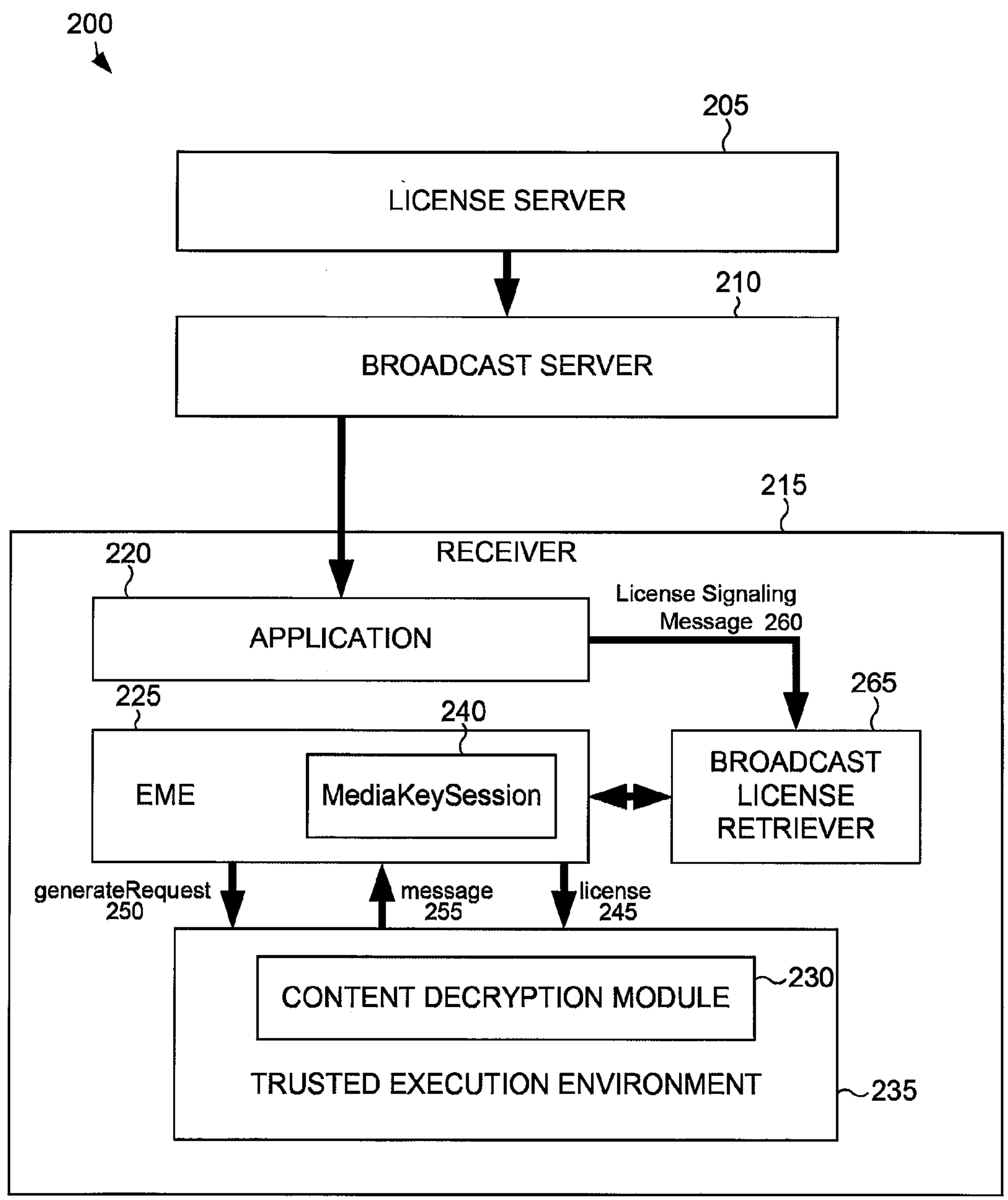
FIG. 2 illustrates an example architecture of a system for enabling content protection over broadcast channels according to this disclosure.

FIG. 2 illustrates example architecture of a system 200 for enabling content protection over broadcast channels according to this disclosure. The embodiment of the communication system 100 shown in FIG. 1 is for illustration only. Other embodiments of the communication system 100 could be used without departing from the scope of this disclosure.

In illustrative embodiment, the system 200 includes servers 205 and 210 that provide information to receiver 215. For example, the servers 205 and 210 may be an example implementation of the servers 104 in FIG. 1. In this example, server 205 is a license server 205 that generates and provides licenses for protected media data to receiver 215. For example, the server 205 may be a server for a DRM system that controls access to protected media data using CENC techniques, media file encryption, decryption keys, etc. The DRM systems may be proprietary and use secret techniques or techniques unknown to other users and operators of DRM content to protect the media content. The broadcast server 210 provides media content to a variety of client devices (e.g., such as client devices 106-115) including receiver 215. In some instances, servers 205 and 210 may be the same server or may be under the control of a single operator or content provider.

The receiver 215 includes a media player application 220 that receives and presents media content to a user of the receiver 115. In this embodiment, receiver 215 uses encrypted media extensions (EME) 225 that specifies an application programming interface (API) that allows receiver 215 to securely decrypt encrypted media content through Javascript control. For example, EME 225 specifies JavaScript APIs which enable application 220 to facilitate the exchange of decryption keys between a Content Decryption Module (CDM) 230, which is a DRM system agent located in the receiver 215, and the license server 205 located somewhere on the network, to support the playback of encrypted media content.

The CDM 230 is a component that performs the content decryption for the receiver 215. The CDM 230 operates in a trusted environment 235 and passes the decrypted frames to a secure decoder for presentation to a user. The trusted environment 235 is a portion of the receiver 215 that is secure and created or approved by the DRM system to protect the decryption of protected media data from exposure or circumvention. For example, the trusted environment 235 may include discrete circuitry that is physically separate from the circuitry of the application 220 or may use common hardware as a virtual machine or object that operates securely from other components in the receiver 215. During normal operation, the receiver 215 invokes extensions in the EME 225 when regular playback detects that the media content is encrypted. After retrieving a license for the encrypted media content, the application 220 updates the MediaKeySession object 240 with the license data that contains one or more keys and their corresponding key ids. The MediaKeySession object 240 passes the license 245 to the CDM 230 for use in decrypting the protected media content.

Embodiments of the present disclosure recognize and take into account that certain procedures for content protection will not work in a pure broadcast environment. For example, a return channel may be needed to connect to license server 205 and retrieve license 245. Embodiments of the present disclosure recognize that internet communications such as uses HTTP communications may be used for license retrieval.

Accordingly, embodiments of the present disclosure provide for securely broadcasting licenses to one or multiple receivers based on the availability of a return channel. For example, if the receiver 215 did not retrieve the license over unicast, the license server 205 may encrypt and broadcast license file to the receiver 215 to decrypt and passes to the CDM 235.

In these embodiments, the EME 225 identifies that the media data is protected, for example, at least a portion is encrypted and a key is needed to decrypt and play the media data. The EME 225 generates and sends a request 250 (e.g., using a generateRequest method) to the CDM 230 for the CDM to 230 to identify the license (or key) needed for the media, which is often specific to the DRM system protecting the media. The CDM 230 returns message 255 that indicates the license needed. Traditionally, this message 255 could be sent to the license server 205 for the license server 205 to supply the license upon request. However, for broadcast channels without a return channel, the receiver 215 may not be able to request the license when needed.

Accordingly embodiments of the present disclosure, provide for the broadcast of the licenses for the media data. The license server 205 and/or the broadcast server 210 may broadcast a license signaling message 260 with, before, or shortly after the broadcast of the media data to the receiver 215. For example, a DRM system (e.g., associated with the server 205) delivers the license for every single receiver encrypted with the public key for that receiver and identified by a hash of the message 255 that was returned by the generateRequest method. The license signaling message 260 includes one or more licenses for a targeted receiver or group of receivers. In particular, the license signaling message 260 includes a license message hash that indicates the license message hash code used to identify the target receiver or group of receivers for the included license(s) as well as encrypted license data. Example syntax for the license signaling message is provided in Table 1 below.

TABLE 1

| Syntax | Value | No. of bits | Mnemonic |
|---|---|---|---|
| LS_message ( ) { | | | |
| message_id | | 16 | uimsbf |
| version | | 8 | uimsbf |
| length | N1 | 32 | uimsbf |
| message_payload { | | | |
| license_message_hash_length | N2 | 8 | uimsbf |
| license_message_hash | | 8*N2 | uimsbf |
| license_data_length | N3 | 16 | uimsbf |
| license_data | | 8*N3 | uimsbf |
| } | | | |
| } | | | |

Fields in this example license signaling message include:

message_id—a 16-bit unsigned integer field that indicates the identifier of the LS message;

version—an 8-bit unsigned integer field that indicates the version of the LS message;

length—a 32-bit unsigned integer field that indicates the length of the LS message in bytes, counting from the beginning of the next field to the last byte of the LS message. The value '0' is not valid for this field;

license_message_hash_length—an 8-bit unsigned integer field that indicates the length in bytes of the license message hash;

license_message_hash—an N3-byte integer field that indicates the license message hash code used to identify the target receiver or group of receivers for the enclosed license;

license_data_length—a 16-bit unsigned integer filed that indicates the length of the encrypted license data; and license_data—an N4-byte unsigned integer field that indicates the encrypted license that corresponds to the license message of which the hash value is included in this message. The license is encrypted using the certificate of the targeted receiver or group of receivers.

Continuing from the discussion of the message 255 above, instead of sending the message 255 received from the CDM 230 to the servers 205 or 210, the receiver 215 hashes the message 255 and uses the hash of the message 255 as a key to identify license messages targeted for the receiver 215 or one of the of groups the receiver 215. For example, receivers 215 may be grouped by geographic region, subscription packages, device type, etc., to reduce the number of uniquely identified licenses that are broadcast. The receiver 215 uses the message 255 that is returned by EME 225 (e.g., from the generateRequest method) to locate the license 245 that is delivered as part of the signaling (e.g., MMT signaling from the servers 205 and/or 210) and pass the license 245 to the CDM 230 through the update method of the MediaKeySession object 240.

The license signaling message 260 is received by the receiver 215 and stored in a broadcast license retriever (BLR) 265. For example, the BLR 265 may store the hash codes and corresponding encrypted license data. The BLR is initially configured with the receiver's 215 certificate, which includes the receiver's 215 public key. The BLR 265 identifies the messages 260 that are targeted to the receiver 215 through a hash mapping of the request message 255 that was provided by the CDM 230. When a message targeting the receiver 215 is located, the receiver 215 decrypts the license 245 and passes the license 245 to the MediaKeySession object 240, which in turn passes the license 245 to the CDM 230 for content decryption.

For example, the receiver 215 may identify the encrypted license data intended for the receiver 215 using a mapping between the hash code(s) from the license signaling message (s) 260 and the hash of the message 255 returned by the CDM 230. Given that the CDM 230 and the license server 205 are agents of the DRM system, the license message hash is generated by the CDM 255 in the same or similar way as the hash codes from the licensing signaling message generated by the license server 205 and the hash generation algorithm(s) may be DRM system specific.

Figure 3:
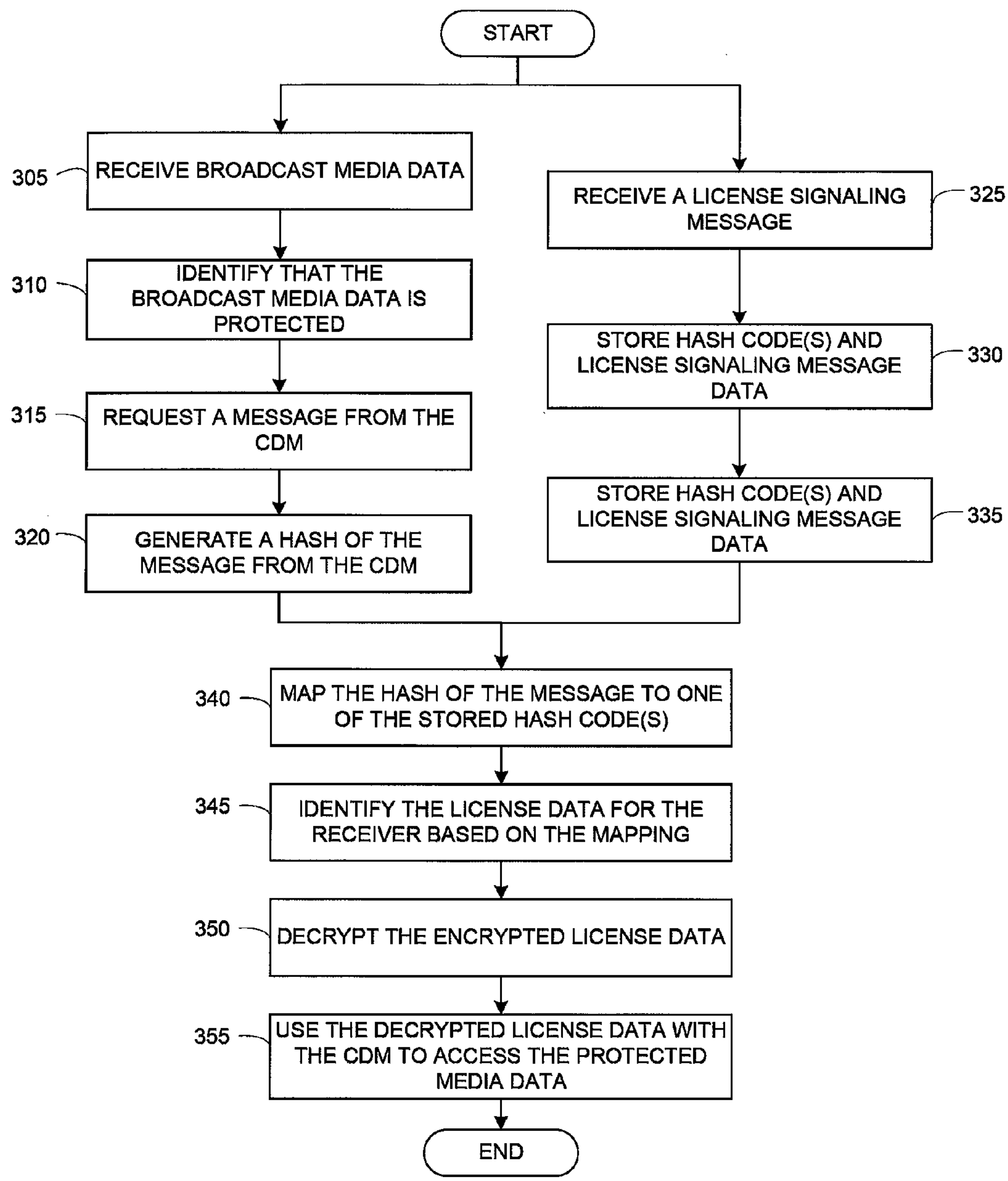
FIG. 3 illustrates a flowchart of an example process for receiving a media license by a receiver according to this disclosure.

FIG. 3 illustrates a process for receiving a media license in accordance with various embodiments of the present disclosure. For example, the process depicted in FIG. 3 may be performed by the receiver 215 in FIG. 2. The process may also be implemented by any one of the client devices 106-115 in FIG. 1 or the electronic device 400 of FIG. 4.

The process begins with the receiver receiving broadcast media data (step 305). For example, in step 305, the receiver may receive media data of which at least a portion is protected. This receiver may be is a set top box or a television or other device that receives a broadcast that in some embodiments does not have a return channel. The receiver passes the received media data to be played, for example, by media player application.

The receiver identifies that at least a portion of the broadcast media data is protected (step 310). For example, in step 310, the receiver may identify that some or all of the media content is encrypted or that a CDM of the receiver needs a license or key to access the media data. The receiver requests a message from the CDM (step 315). For example, in step 315, the receiver may use a generateRequest method to request a message used to identify a license needed by the receiver for the receiver to access the content. The receiver generates a hash of the message from the CDM (step 320).

The receiver receives a license signaling message (step 325). For example, in step 325, the receiver may receive a license signaling message that includes encrypted license data that is encrypted using a public key of the receiver or group of receivers. The license signaling message may be is received at the receiver without the receiver requesting the license signaling message. For example, the encrypted license data may be received over a broadcast channel that does not have a return channel for the receiver to request the license. The license signaling message may also include a license message hash length field indicating a length of a license message hash included in the license signaling message and a license data length field indicating a length of the encrypted license data included in the license signaling message.

The receiver identifies hash code(s) in the license signaling message (step 330). For example, in step 330, the receiver may identify hash codes from the license message hash in the license signaling message that indicate the receiver or a group of receivers for the encrypted license data. The receiver stores hash code(s) and license signaling message data (step 335). For example, in step 335, the receiver may store the hash code(s) and license data in the BLR 265.

The receiver maps the hash of the message from step 320 to one of the stored hash code(s) from step 335 (step 340). For example, in step 340, instead of sending the message from the CDM to a license server, the receiver may perform this mapping to identify the license that has been broadcast with the media data. While this mapping is advantageous in embodiments where the receiver 215 does not have a return channel (e.g., non-internet connected or legacy set-top boxes or televisions), this mapping to identify broadcast licenses may still be implemented in embodiments where a return channel is available (e.g., in devices that are internet connected).

The receiver identifies the encrypted license data for the receiver in the license signaling message based on the mapping (step 345). For example, in step 345, the receiver may identify the encrypted license data for the receiver as corresponding to the matched hash code from the mapping between the one or more hash codes in the license signaling message and a hash of the message from the CDM.

The receiver decrypts the encrypted license data (step 350). For example, in step 350, the receiver may decrypt the encrypted license data using a private key of the receiver. The receiver uses the decrypted license data with the CDM to access the protected media data (step 355). For example, in step 355, the receiver may pass the decrypted license data to the CDM to decrypt encrypted media data or may pass the encrypted license data to the CDM for decryption and use by the CDM. For example, the decrypted license data may include one or more encryption keys that the DRM may use to decrypt the encrypted broadcasted content received by the receiver and the media content can be played by the receiver and presented to a user. In these embodiments, the license data may be DRM specific and unknown or unusable by components outside of the CDM.

Although FIG. 3 illustrates an example of processes for receiving a media license, various changes could be made to FIG. 3. The numbering of the steps is not meant to necessarily imply a particular order to the steps. For example, while shown as a series of steps, various steps in FIG. 3 could overlap, occur in parallel, occur in a different order, occur multiple times or be omitted in some embodiments. For example, the any of the steps for the license signaling message receipt and processing (e.g., steps 325-335) may occur before, during, or after any of the steps for the receipt and processing of the broadcast media data (e.g., steps 305-320).

Figure 4:
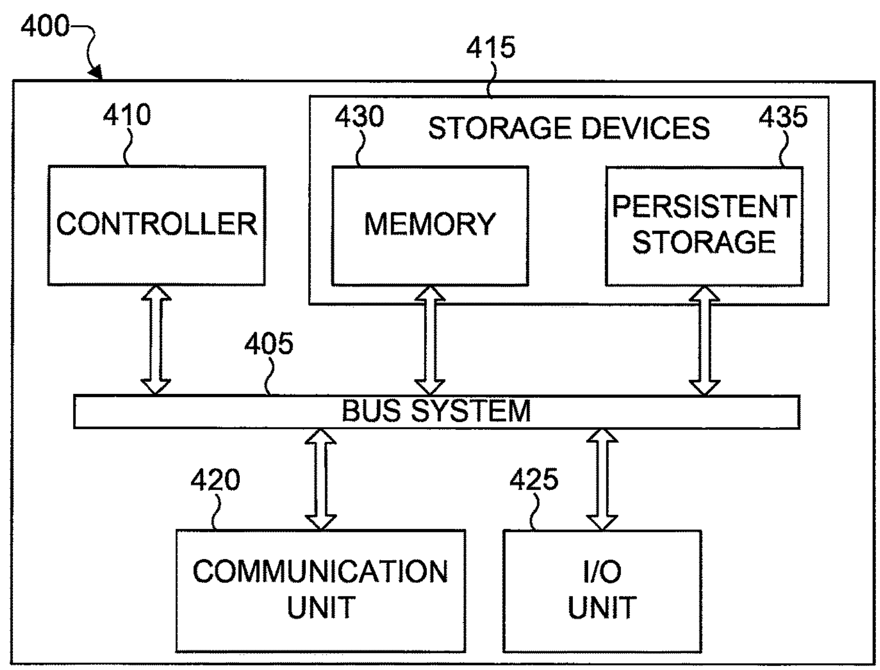
FIG. 4 illustrates an example electronic device according to this disclosure.

FIG. 4 illustrates an example electronic device 400 in the communication system 100 according to this disclosure. In particular, the electronic device 400 illustrates example components that may be included in any one of the server 104 or the client devices 106-115 in FIG. 1.

As shown in FIG. 4, the electronic device 400 includes a bus system 405, which supports communication between at least one controller 410, at least one storage device 415, at least one communications unit 420, and at least one input/output (I/O) unit 425.

The controller 410 executes instructions that may be loaded into a memory 430. The controller 410 may include any suitable number(s) and type(s) of processors or other devices in any suitable arrangement. Example types of controllers 410 include microprocessors, microcontrollers, digital signal processors, field programmable gate arrays, application specific integrated circuits, and discreet circuitry. For example, the controller 410 may implement operations performed by the receiver 215 or either of the servers 205 and 210. In another example, the controller 410 may decrypt and/or decode received media data as discussed above.

The memory 430 and a persistent storage 435 are examples of storage devices 415, which represent any structure(s) capable of storing and facilitating retrieval of information (such as data, program code, and/or other suitable information on a temporary or permanent basis). The memory 430 may represent a random access memory or any other suitable volatile or non-volatile storage device(s). The persistent storage 435 may contain one or more components or devices supporting longer-term storage of data, such as a read-only memory, hard drive, Flash memory, or optical disc. For example, the memory 430 may contain instructions for implementing license signaling message generation or mapping of hash codes from license signaling message to a hash of a message from a CDM.

The communications unit 420 supports communications with other systems or devices. For example, the communications unit 420 could include a network interface card, a cable modem, a broadcast receiver, or a wireless transceiver facilitating communications over the network 102. The communications unit 420 may support communications through any suitable physical or wireless communication link(s).

The I/O unit 425 allows for input and output of data. For example, the I/O unit 425 may provide a connection for user input through a keyboard, mouse, keypad, touchscreen, or other suitable input device. The I/O unit 425 may also send output to a display, printer, or other suitable output device.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A receiver for receiving a media license, the receiver comprising:

a communication unit configured to:
- receive broadcasted media data including at least a portion that is protected; and
- receive a license signaling message including encrypted license data and one or more hash codes; and a controller configured to:
- identify that a license is needed by the receiver to access the protected portion of the broadcasted media data;
- generate, in response to identifying that the license is needed to access the protected portion of the broadcasted media data, a request to a content decryption module (CDM) in the receiver to generate a license request message;
- generate a hash of the license request message generated by the CDM in the receiver in response to receipt of the license request message from the CDM;
- match the hash of the license request message generated by the CDM in the receiver to one of the one or more hash codes included in the license signaling message;
- identify the encrypted license data for the receiver as corresponding to the matched hash; and
- access the protected portion the broadcasted media data using the identified encrypted license data.

2. The receiver of claim 1, wherein the controller is further configured to:

receive the license request message from the CDM in the receiver;

identify the one or more hash codes in the license signaling message; and identify the encrypted license data for the receiver based on a mapping between the one or more hash codes in the license signaling message and the hash of the license request message from the CDM.

3. The receiver of claim 1, wherein the encrypted license data is encrypted using a public key of the receiver.

4. The receiver of claim 1, wherein:

the controller is configured to decrypt the encrypted license data using a private key of the receiver; and the receiver is configured to use the decrypted license data with the CDM to access the media data that is protected.

5. The receiver of claim 1, wherein the one or more hash codes indicate the receiver or a group of receivers for the encrypted license data.

6. The receiver of claim 1, wherein:

the license signaling message further includes a license message hash length field indicating a length of a license message hash included in the license signaling message and a license data length field indicating a length of the encrypted license data included in the license signaling message, and the license message hash indicates one of the hash codes.

7. The receiver of claim 1, wherein the license signaling message is received at the receiver without the receiver requesting the license signaling message.

8. The receiver of claim 1, wherein:

the encrypted license data is received over a broadcast channel without a return channel, and the receiver is a set top box or a television.

9. A method for receiving a media license by a receiver, the method comprising:

receiving broadcasted media data including at least a portion that is protected;

receiving a license signaling message including encrypted license data and one or more hash codes;

identifying that a license is needed by the receiver to access the protected portion of the broadcasted media data;

generating, in response to identifying that the license is needed to access the protected portion of the broadcasted media data, a request to a content decryption module (CDM) in the receiver to generate a license request message;

generating a hash of the license request message generated by the CDM in the receiver in response to receipt of the license request message from the CDM;

matching the hash of the license request message generated by the CDM in the receiver to one of the one or more hash codes included in the license signaling message;

identifying the encrypted license data for the receiver as corresponding to the matched hash; and accessing the protected portion the broadcasted media data using the identified encrypted license data.

10. The method of claim 9, further comprising:

receiving the license request message from the CDM in the receiver; and identifying the one or more hash codes in the license signaling message, wherein identifying the encrypted license data for the receiver comprises identifying the encrypted license data for the receiver based on a mapping between the one or more hash codes in the license signaling message and the hash of the license request message from the CDM.

11. The method of claim 9, wherein the encrypted license data is encrypted using a public key of the receiver.

12. The method of claim 9, further comprising:

decrypting the encrypted license data using a private key of the receiver; and using the decrypted license data with the CDM to access the protected portion of the media data.

13. The method of claim 9, wherein the one or more hash codes indicate the receiver or a group of receivers for the encrypted license data.

14. The method of claim 9, wherein:

the license signaling message further includes a license message hash length field indicating a length of a license message hash included in the license signaling message and a license data length field indicating a length of the encrypted license data included in the license signaling message, and the license message hash indicates one of the hash codes.

15. The method of claim 9, wherein the license signaling message is received at the receiver without the receiver requesting the license signaling messages.

16. The method of claim 9, wherein:

the encrypted license data is received over a broadcast channel without a return channel, and the receiver is a set top box or a television.

17. A server for providing a media license, the server comprising:

a controller configured to generate a license signaling message including (i) encrypted license data and (ii) a license message hash indicating one or more hash codes used to identify a receiver or a group of receivers for the encrypted license data; and a communication unit configured to send, under control of the controller, the license signaling message to the receiver or the group of receivers, wherein the one of the one or more hash codes is mapped to a hash generated from a license request message generated by a content decryption module (CDM) in the receiver or respective CDMs in the group of receivers to identify the encrypted license data needed by the receiver or group of receivers to access a protected portion of broadcasted media data, wherein the license request message is requested from the CDM in the receiver or the respective CDMs in the group of receivers based on identification that a license is needed by the receiver or group of receivers to access the protected portion of the broadcasted media data, and wherein the server is a license server configured to send the license signaling message to the receiver or the group of receivers via a broadcast server that broadcasts the media data that is protected and that the license data is used to access.

18. The server of claim 17, wherein:

the encrypted license data is encrypted using a public key of the receiver or the group of receivers, and license signaling message further includes a license message hash length field indicating a length of the license message hash included in the license signaling message and a license data length field indicating a length of the encrypted license data included in the license signaling message.

* * * * *